United States Patent [19]

Hoag

[11] Patent Number: 4,541,209
[45] Date of Patent: Sep. 17, 1985

[54] VAULT MOUNT FOR ELECTRICAL APPARATUS

[75] Inventor: Jack E. Hoag, 12341 Rebecca La., Santa Ana, Calif. 92705

[73] Assignee: Jack E. Hoag, Santa Ana, Calif.

[21] Appl. No.: 522,808

[22] Filed: Aug. 15, 1983

[51] Int. Cl.$^4$ .......................... E02D 29/14; H02G 9/10
[52] U.S. Cl. ........................................... 52/20; 174/37; 248/293
[58] Field of Search ................. 52/19, 20, 21; 174/37; 248/240.4, 293, 291; 211/59.4, 150; 446/63, 64, 65, 308, 309; 124/7

[56] References Cited

U.S. PATENT DOCUMENTS

| | | | |
|---|---|---|---|
| 1,778,373 | 10/1930 | Shumaker | 248/293 |
| 2,350,140 | 5/1944 | Wilton | 124/7 X |
| 2,895,702 | 7/1959 | Pierce | 248/293 X |
| 3,522,970 | 8/1970 | Francis | 248/291 X |
| 3,617,608 | 11/1971 | Wisniewski | 174/37 |
| 3,672,103 | 6/1972 | Kost | 174/37 X |
| 4,355,197 | 10/1982 | Jönsson | 174/37 |

FOREIGN PATENT DOCUMENTS 2509404  12/1982  France ..................................... 52/20

Primary Examiner—Donald G. Kelly
Assistant Examiner—Richard E. Chilcot, Jr.
Attorney, Agent, or Firm—Hubbard & Stetina

[57] ABSTRACT

This invention provides a convenient apparatus and method for mounting equipment in an underground vault to provide convenient access to the equipment whenever such access is necessary. The vault mount includes a frame having one end thereof permanently pivotally mounted to the frame releasably attached to a second wall of the vault. Suitable springs are mounted between the first wall of the vault and the frame to urge the frame to pivot about the mounting to the first wall. When the second end of the frame is released from its wall mount, the frame and the apparatus mounted thereon pivots from a generally horizontal position in the vault to a generally vertical position with the equipment mounted on the frame extending out of the vault.

5 Claims, 2 Drawing Figures

VAULT MOUNT FOR ELECTRICAL APPARATUS

BACKGROUND OF THE INVENTION

This invention relates generally to apparatus and methods for mounting equipment in vaults and particularly to apparatus and methods for mounting electrical equipment in underground vaults. Still more particularly, this invention relates to apparatus and methods for mounting electrical equipment, such as that used in telephonic communications systems, in underground vaults while including means for removing the equipment from the vault for providing access to the equipment.

It is becoming increasingly common for electrical utilities such as those which provide telephone service and electrical power to have underground electrical lines and, accordingly, underground equipment such as switching stations, transformers and the like. Many communities presently require such utilities to have all of their lines and associated equipment underground. Although having such equipment underground makes a positive contribution to the aesthetic appearance of a neighborhood and prevents exposure of the equipment to certain outdoor environmental hazards, is sometimes difficult for a person to gain access to underground equipment for maintenance and other purposes.

Underground telephone installations in particular, frequently require a person to gain access to equipment located in underground vaults having upper covers that are approximately flush with the ground level. Heretofore, the persons had to either physically enter the vault, which therefore had to be made large enough to accomodate the person and the equipment; or the equipment had to be lifted from the vault either manually or by use of machinery external to the vault. It is inconvenient, wasteful and unnecessarily expensive to place a relatively small piece of electrical equipment in an underground vault large enough to accomodate a human being merely for the purposes of servicing the equipment. Although the equipment may be relatively small, it may also be too heavy for an individual to easily lift without the aid of other equipment. The use of other equipment to lift the electrical apparatus from the vault requires that the equipment be transported from one vault to another for lifting the equipment from the vault.

Therefore, there is a need in the art for an apparatus and method for mounting electrical equipment in underground vaults to provide convenient access to equipment mounted in a vault, which is conveniently and economically sized to accomodate the equipment without having the extra space necessary to accomodate a person in the vault.

SUMMARY OF THE INVENTION

The present invention provides a convenient apparatus and method for mounting equipment in an underground vault to provide convenient access to the equipment whenever such access is necessary. The vault mount of the present invention includes a frame having one end thereof permanently pivotally mounted to a first wall of the vault and the other end of the frame releasably attached to a second wall of the vault. Suitable springs are mounted between the first wall of the vault and the frame to urge the frame to pivot about the mounting to the first wall. When the second end of the frame is released from its wall mount, the frame and the apparatus mounted thereon pivots from a generally horizontal position in the vault to a generally vertical position with the equipment mounted on the frame extending out of the vault.

DESCRIPTION OF THE PREFERRED EMBODIMENT

Figure 1:
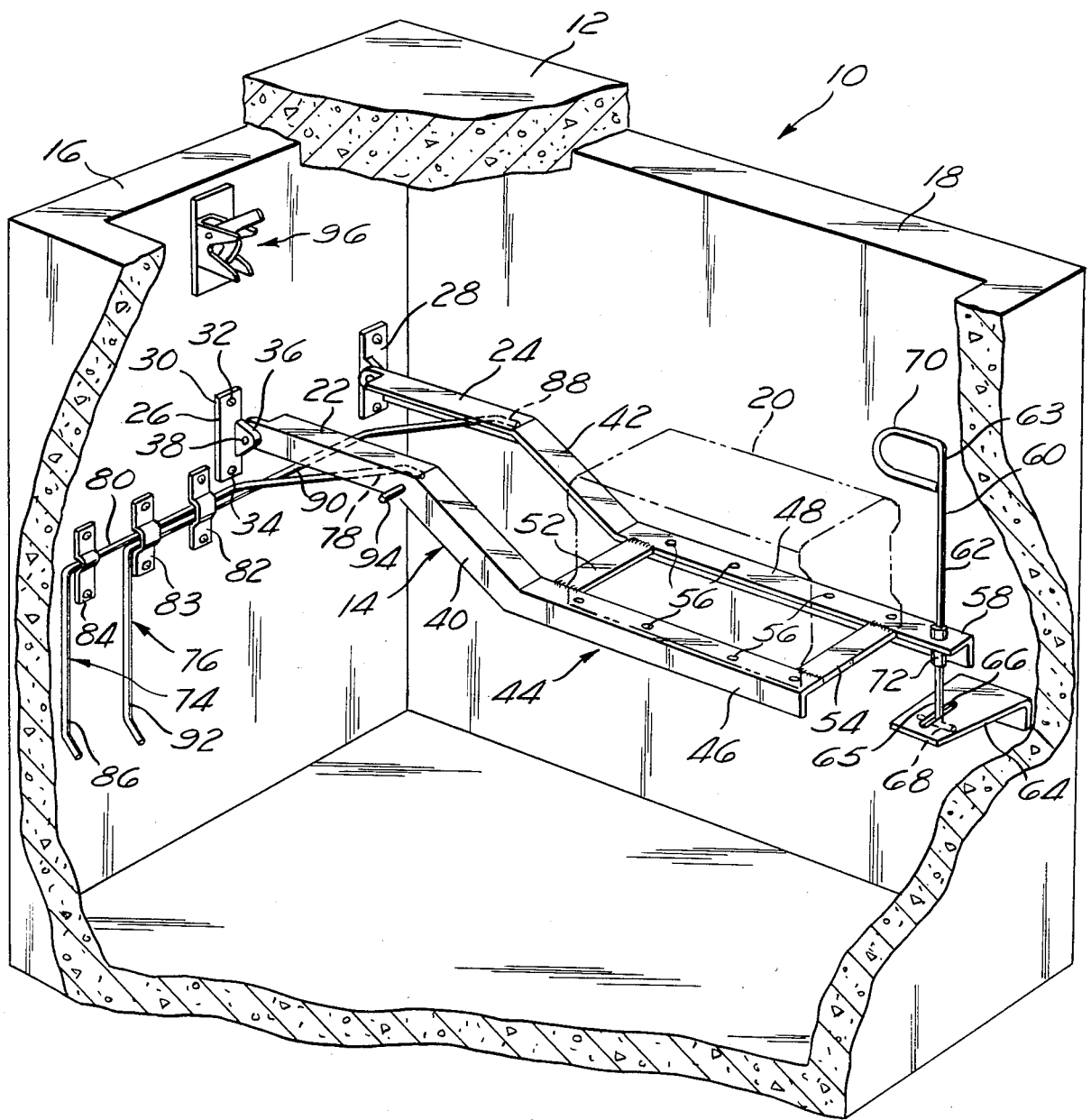
FIG. 1 is a cut away perspective view of the invention inside a vault.

Referring to FIG. 1, a vault 10, which may be formed of concrete or other suitable material, has an upper cover 12 that is preferably removable. A vault mount 14 according to the invention is shown mounted between a first wall 16 of the vault 10 and a second wall 18. A box 20 shown in phantom lines in FIG. 1 represents device such as a piece of electrical equipment which must be mounted in the vault 10. Details of the structure of the box to be mounted in the vault 10 are not essential to the present invention and are, therefore, not explained in detail herein. It is, however, essential that if the box 10 is connected to other equipment (not shown), then the connections (not shown) must sufficiently long and flexible to permit the box 10 to be raised a short distance out of the vault as described herein.

Figure 2:
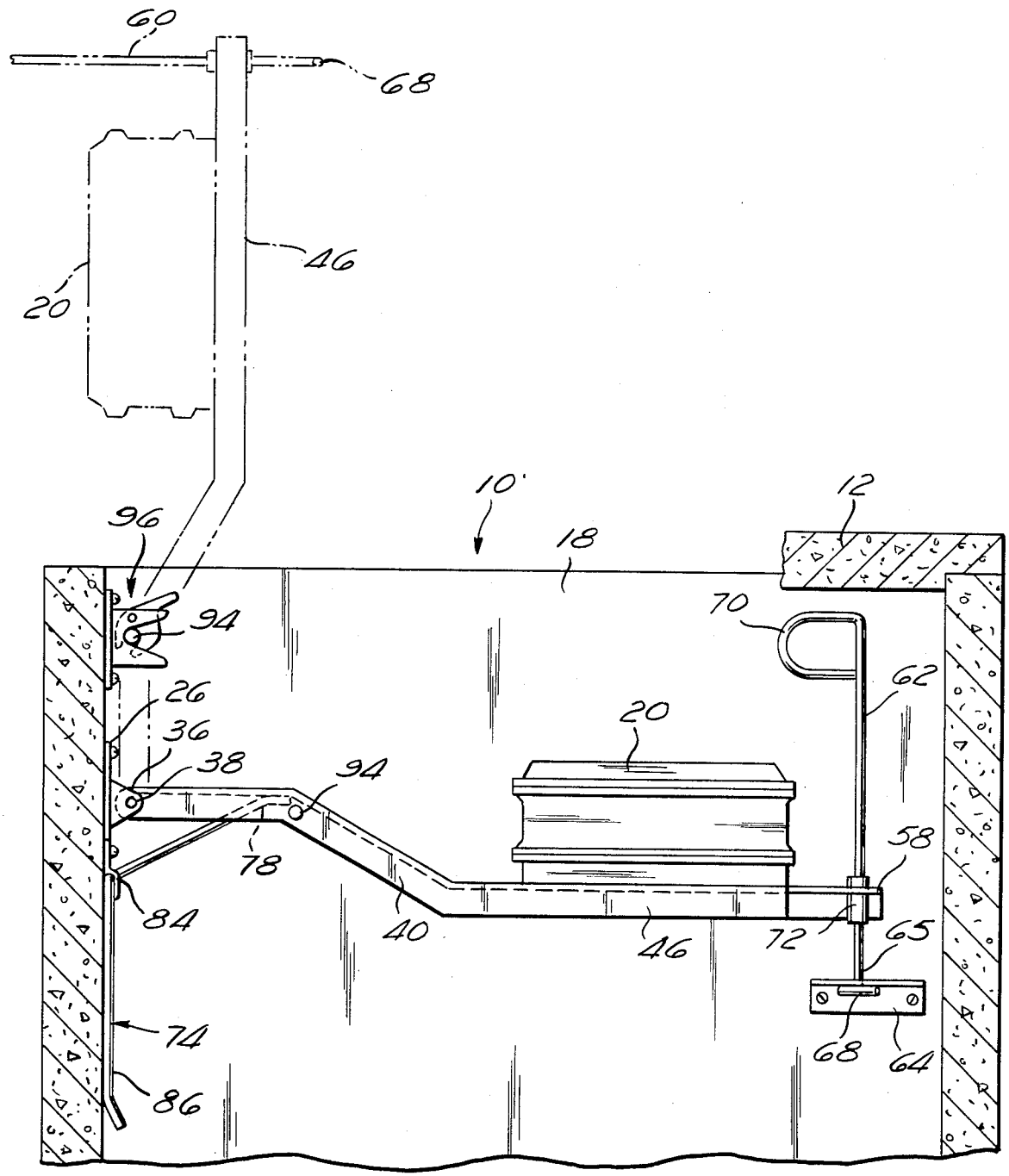
FIG. 2 is an elevation view of the invention inside the vault of FIG. 1.

In the exemplary environment shown in FIGS. 1 and 2, the vault mount 14 comprises a pair of rails 22 and 24, each being pivotally mounted to the first wall 16 by suitable mounting brackets 26 and 28, respectively. Mounting brackets 26 and 28 may comprise any convenient pivotal mounting devices. The bracket 26, for example, is shown to comprise a flat, rectangular plate 30, which a pair of screws 32 and 34, or other suitable fastening means, secure to the first wall 16. A projection 36 extends generally perpendicularly from the rectangular plate 30 and includes a cylindrical passage therethrough for receiving a cylindrical stud 38 that extends from the end of the rail 22. The bracket 28 may be formed similarly to the bracket 32 and therefore is not described in further detail.

As shown in FIG. 1, the rails 22 and 24 are generally parallel and extend generally perpendicularly away from the wall 16. The rail 22 includes an inclined portion 40 that extends at an angle from the generally horizontal rail 22, as shown in FIG. 1, into the vault 10. The rail 24 includes an inclined portion 42 similar to the inclined portion 40.

A seat 44 extends from the inclined portions 40 and 42. The seat 44 preferably has a generally rectangular configuration formed of an extension 46 of the rail 22 connected to the inclined portion 40 and an extension 48 of the rail 24 connected to the inclined portion 42. The extensions 46 and 48 are preferably generally parallel and are connected by crossbars 52 and 54 to provide a rigid structure. The extensions 46 and 48 may include a plurality of passages 56 therethrough to provide convenient means for attaching the box 20 to the seat 44.

Referring to FIGS. 1 and 2, the rail 24 has an end portion 58 which extends beyond the seat 44. The end 58 includes a passage therein for rotatably mounting a key 60, which includes an elongated shaft 62. A bracket 64 having a slot 66 therein extends away from the wall 18 to align the center of the slot 66 with the elongate shaft 62. The elongate shaft 62 has a proximal end 63 having a handle 70 formed thereon and a distal end 65 having a cross piece 68 connected perpendicularly thereto. As shown in FIGS. 1 and 2, the distal end 65 extends through the slot 66, and the cross piece 68 is oriented generally perpendicularly to the slot 66 to retain the end 58 against upward motion away from the bracket 64. The handle 70 attached to the proximal end 63 of the shaft 62 provides convenient means for rotating the cross piece 68 to either align the cross piece 68 parallel with the slot 66 to permit the frame 44 to be pivoted to lift the box 20 out of the vault 10 or to orient the cross piece 68 perpendicular to the slot to retain the box 20 and frame 14 stationary in the vault 10. The shaft 62 preferably has an enlarged portion which rotatably mounts the shaft 62 in the end 58 of the rail 24 to retain the shaft 62 in a generally perpendicular orientation relative to the end 58.

Still referring to FIGS. 1 and 2, the vault mount 14 preferably includes a pair of torsion springs 74 land 76 which provide means for biasing the frame 44 toward pivotal motion about the brackets 26 and 28 to lift the box 20 out of the vault 10 to the position shown in phantom lines in FIG. 2. The torsion spring 74 includes an end 78 engaged with the rail 22, a central portion 80 retained adjacent the wall 16 a plurality of brackets 82–84 and an end 86 spring biased against the wall 16 by torsion in the central portion 86. Similarly, the torsion spring 76 includes an end 88 engaged with the rail 24, a central portion 90 retained adjacent by the brackets 82 and 83 adjacent the wall 16 and an end 92 urged against the wall 16 by torsion in the central portion 90. The central portions 80 and 90 of the torsion springs 74 and 76, respectively, are under torsion to urge the frame 44 to rotate counter-clockwise about the brackets 26 and 28 as viewed FIGS. 1 and 2 to tend to lift the box 20 to the elevated position shown in phantom lines in FIG. 2.

The rail 22 preferably includes a projection 94 extending therefrom in general parallel alignment with the wall 16. A latch 96 is suitably mounted to the wall 16 to receive the projection 94 therein as shown in FIG. 2 when the box is in the elevated position. Assembly of the vault mount 14 may be done in a number of sequential steps, however, a satisfactory method of assembly is to first mount the brackets 26 and 28 to the wall 16 and to mount the bracket 64 to the wall 18. The seat 44 should be rotated into the elevated position to facilitate installation of the torsion springs 74 and 76 because when the seat 44 is in the elevated position, the torsion spring forces in the torsion springs 74 and 76 are at the minimum possible values for the fully assembled structure. The latch 96 should be installed when the seat is in the elevated position to insure that the projection 94 properly engages the latch 96. The central portion 80 of the torsion spring 74 should be properly positioned on the wall 16 to insure that the end 78 of the torsion spring 74 remains engaged with the rail 22 at all positions thereof between and including the upper position as shown in phantom lines in FIG. 2 and the lower position as shown in FIGS. 1 and 2. The torsion spring 76 must be similarly aligned to insure that the end 88 thereof remains in contact with the rail 24.

The torsion springs 74 and 76 may be formed such that there is very little or no torsion spring force on the rails 22 and 24 when the seat 44 is in the elevated position. Having the rail 22 to the wall 16 with the projection 94 being engaged in the latch 96 insures that the box 20 remains in a stable position so that a person may perform desired tasks on equipment located in the box 20 without undesirable movement thereof.

After the vault mount 14 is fully assembled and all components thereof attached to the desired walls 16 and 18, the box 20 is secured to the seat 44. After all necessary connections (not shown) have been made to the box 20, the box 20 and the seat 44 are rotated clockwise about the brackets 26 and 28 to position the box 20 within the vault 10. In order to lock the vault mount 14 inside the vault 10, the crossmember 68 of the key 60 is aligned parallel with the slot 66 and inserted therethrough. After the crossmember 68 has passed completely through the slot 66 in the bracket 64, rotation of the handle 70 to place a crossmember 68 approximately perpendicular to the slot 66 locks the frame 44 to the bracket 64. When the seat 44 is in its locked down position, the spring biase forces from the torsion spring 74 and 76 urge the crossmember 68 against the underside of the bracket 64 to frictionally engage the crossmember 68 and the bracket 64 so that small vibrations do not turn crossmember 68 into alignment with the slot 66 thereby inadvertently releasing the seat 44 from the locked down position.

In order to gain access to the box 20, a person must first remove the cover 12 from the vault 10 and then rotate the key 60, preferably by grasping the handle 70 and exerting a force thereon to rotate the shaft 62 so that the cross piece 68 is aligned parallel with the slot 6. Rotation of the handle 62 may be facilitated by exerting a downward force on the handle or on the box 20 to relieve the frictional engagement of the cross piece 68 with the underside of the bracket 64. After the key 60 has been released from the bracket 64, the individual should continue to exert a clockwise torque on the vault mount 14 as viewed in FIGS. 1 and 2 in order to prevent it from rapidly springing upward against the wall 16. The seat 44 should be permitted to rotate slowly in a counter-clockwise direction until the projection 94 is retained within the latch 96. After the box 20 has been elevated and the projection 94 secured within the latch 96, a person may gain easy access to the box 20 to perform desired tasks upon equipment therein.

Although the present invention has been described with reference to a specific preferred embodiment, it should be apparent to persons skilled in the art that changes may be made in the structure described herein without departing from the spirit of the invention. Accordingly, it is intended that the scope of the invention be limited only by the claims appended hereto.

What is claimed is:

1. An apparatus for mounting a device to the walls of a vault or the like to selectively provide access to the device, comprising:

a frame having a first end and a second end;

means for pivotally mounting the first end of the frame within the vault;

means for releasably mounting the second end of the frame to a second wall of the vault to selectively retain the device within the vault; and means for mounting the device to the frame in a first position inside the vault so that pivoting the frame about the pivotal mounting means rotates the device to a second position outside the vault;

spring means biased for urging the frame in pivotal movement about the pivotal mounting means to lift the device outside the vault; and means for releasably retaining the frame against pivotal movement when the device is in the second position.

2. The apparatus of claim 1 wherein the means for releasably retaining the frame in connection with the first wall of the vault comprises:
   a projection extending from the frame; and
   means attached to the first wall for selectively releasably engaging the projection to hold the frame in the second position.

3. The apparatus of claim 1 wherein said frame includes:
   a pair of generally parallel rails; and
   a plurality of crossmembers connected between the pair of rails.

4. The apparatus of claim 1 wherein the spring biasing means includes:
   a first spring engaged with the first rail; and
   a second spring engaged with the second rail, the first and second springs acting to tend to cause the frame to rotate to move the second end thereof out of the vault.

5. The apparatus of claim 1 wherein the means for releasably mounting the second end of the frame within the vault includes:
   a bracket having an elongate slot therein;
   a key mounted to said frame, said key comprising an elongate shaft having a distal end with a handle formed thereon and a proximal end with a crossmember attached thereto, the key being rotatably mounted to the frame so that the cross piece may be passed through the slot and rotated to a position generally perpendicular thereto to retain the frame in a predetermined position in the vault.

* * * * *